United States Patent
Weiser et al.

(10) Patent No.: US 6,557,491 B1
(45) Date of Patent: May 6, 2003

(54) MULTI POSITIONABLE FEEDER-PLANTER

(75) Inventors: Isaac Weiser, Tarzana, CA (US); Margaret Weiser, Tarzana, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 0 days.

(21) Appl. No.: 10/189,313

(22) Filed: Jul. 1, 2002

(51) Int. Cl.[7] .............................................. A01K 57/08
(52) U.S. Cl. .............................................. 119/57.8
(58) Field of Search ........................... 119/52.2–52.4, 119/57.8, 57.9

(56) References Cited

U.S. PATENT DOCUMENTS

| | | | | |
|---|---|---|---|---|
| 1,552,290 A | * | 9/1925 | Fowler | 108/93 |
| 3,134,360 A | * | 5/1964 | Lewis | 119/57.01 |
| 3,784,024 A | * | 1/1974 | Kristy | 211/131.2 |
| 3,999,519 A | | 12/1976 | Rodemeyer | 119/20 |
| 4,399,772 A | | 8/1983 | Salinas | 119/51.5 |
| 4,476,649 A | * | 10/1984 | Zaruba | 446/273 |
| 4,526,134 A | | 7/1985 | Sapp | 119/57 |
| 4,574,822 A | | 3/1986 | Helinsky | 132/79 |
| D285,592 S | | 9/1986 | Kushner | D21/108 |
| 4,878,869 A | * | 11/1989 | Yamare et al. | 446/130 |
| 4,960,275 A | * | 10/1990 | Magon | 472/13 |
| 5,003,925 A | | 4/1991 | Roberts | 119/51.15 |
| 5,021,901 A | | 6/1991 | Mondocea et al. | 360/92 |
| 5,022,346 A | | 6/1991 | Robertson | 119/52.2 |
| 5,039,180 A | | 8/1991 | Lemons | 312/267 |
| 5,165,364 A | | 11/1992 | Horkey | 119/57.8 |
| D342,587 S | | 12/1993 | Bransky et al. | 119/52.2 |
| 5,319,897 A | * | 6/1994 | Royer | 472/30 |
| 5,370,247 A | | 12/1994 | Handleman | 211/164 |
| 5,372,474 A | | 12/1994 | Miller | 415/916 |
| 5,387,146 A | | 2/1995 | Smith et al. | 446/219 |
| D361,172 S | | 8/1995 | Gates | 119/57.8 |
| D408,947 S | | 4/1999 | Mandell | D30/124 |

* cited by examiner

*Primary Examiner*—Thomas Price
(74) *Attorney, Agent, or Firm*—Cislo & Thomas LLP

(57) ABSTRACT

A ferris wheel-like structure for feeding birds or acting as a planter which may be supported in one of a myriad of positions.

11 Claims, 4 Drawing Sheets

MULTI POSITIONABLE FEEDER-PLANTER

A portion of the disclosure of this patent document contains material which is subject to copyright protection. The copyright owner has no objection to the facsimile reproduction by anyone of the patent disclosure as it appears in the U.S. Patent and Trademark Office patent files or records, but otherwise reserves all copyright rights whatsoever.

BACKGROUND OF THE INVENTION

1. Field of the Invention

This invention relates to novelty items that may be considered ornamental for placement in a garden or back yard environment wherein, in the simplest embodiment, it comprises a bird feeder which provides a dynamic platform for feeding birds and, in an alternate embodiment, provides a unique planter for plants where, in both embodiments, that is feeding birds and having plants, a ferris wheel-like structure is utilized.

2. Description of the Related Art

This invention relates to a unique, ornamental device configured very much like a ferris wheel having one or a plurality of containers wherein the containers may contain birdseed and such that, when a bird alights to feed, movement of the ferris wheel is achieved. The containers may also, alternately, contain plants in which event manual or wind movement of the ferris wheel-like structure is possible. Where alternating containers contain bird food and plants it is obvious that the alighting of a bird to feed on the bird food will cause rotation of the ferris wheel-like structure. The ferris wheel-like structure is ideally suited for ornamental and entertainment in garden or porch settings, and is unique in that it is a dynamic structure which provides enjoyment to viewers in proximity to the device.

SUMMARY OF THE INVENTION

The invention pertains to a ferris wheel-like structure comprising the combination of at least two spaced apart extending support members forming a common axis of support wherein a rotatable member is operatively connected to the extending support members and wherein the rotatable member is freely and rotatably supported from the extending support members and wherein at least one holding member support member is operatively associated with the rotatable member which is adapted to retain in operative relationship thereto a holding member and a base operatively connected to said at least two spaced apart extending support members and being adapted to support the ferris wheel-like structure in one of a myriad of positions, whether it be horizontal, vertical or anything in between.

OBJECTS OF THE INVENTION

It is an object of the present invention to provide a ferris wheel-like structure which may be used as a bird feeder or the like and which provides for dynamic operation and enjoyment of the view of same.

It is another object of the invention to provide a ferris wheel-like structure which has an upstanding support member by which a rotatable member is associated and wherein the rotatable member has one or a plurality of containers in which bird food or plants may be contained.

It is another still more important object of the invention to provide a ferris wheel-like structure which has an upstanding support and base which allows for the mounting thereof in one of a myriad of positions and wherein a rotatable member is freely rotatably supported and which rotatable member has one or a plurality of containers in which bird food or plants or the like are contained and wherein upon the alighting of a bird on one or more of the containers, rotation or rotatable motion is imparted to the rotatable member.

It is still another important specific object of the invention to provide a ferris wheel-like structure having spaced apart upright supports which support a rotatable member having a plurality of extending rays and wherein each ray is adapted to hold a container for containing bird food or other materials.

It is still another more.important, specific, object of the invention to provide a ferris wheel-like structure which has an upstanding or extending support member forming a common axis of support and wherein a rotatable member is operatively connected to the two upstanding extending support members wherein the support members are affixed or form part of a base which allows for supporting the ferris wheel-like structure in horizontal or vertical planes and wherein the rotatable member has a plurality of extending rays and each of the rays has supported thereon in releasable manner, a container which is adapted to hold birdseed or plants.

These and other objects and advantages of the present invention will become apparent from a review of the following specification and accompanying drawings.

BRIEF DESCRIPTION OF THE DRAWINGS

FIG. 1 is a side view of one embodiment of the invention showing the ferris wheel-like structure being supported from a pole or the like;

FIG. 4 is a view similar to FIG. 3 but showing how the ferris wheel-like structure of the invention may be supported on a ceiling or the like;

DESCRIPTION OF THE PREFERRED EMBODIMENT(S)

Figure 1:
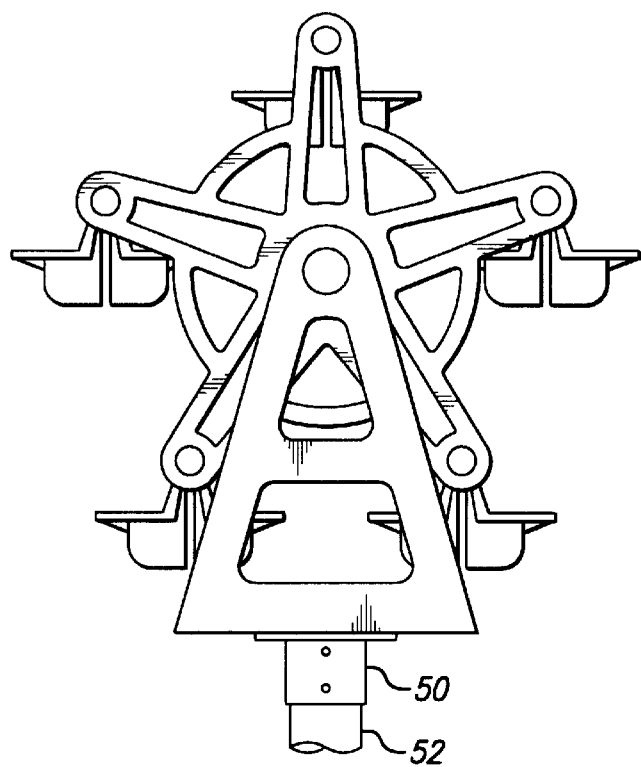

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the figures of drawings wherein like numerals of reference designate like references throughout, in its most basic form the ferris wheel-like structure 2 of the invention (best seen in FIG. 5) comprises a support member 4 having a base 6 and extending, spaced apart support members 8 and 10 forming a common axis of support 12 by means of axel 14 having retaining means 16 comprising rivets or heads (or bolt and nut) and which forms an axis of support for rotatable member 18 in this particular instance made up of first member 20 having a plurality of extending arms or rays 22 with opposed second member 24 having a plurality of extending rays or arms 26. The rotatable circularly shaped members 20 and 24 having the rays or arms 22 and 26 are held in spaced apart relationship by means of spacer rods 30 each of which are held in place by rivets or heads 32 (or bolt and nut) and each of which are adapted to receive a holder or container 40 in this instance being of unitary construction and made of plastic material having two opposed trays 42 and 44 with extending lips, perches or steps 46 and 48 by which the ferris wheel-like structure 2, more specifically the rotatable member 18, may be rotated either by hand or be reason of a bird or the like alighting or perching on the steps 46 or 48 the weight of the bird giving dynamic.action to the rotating element 18.

Figure 5:
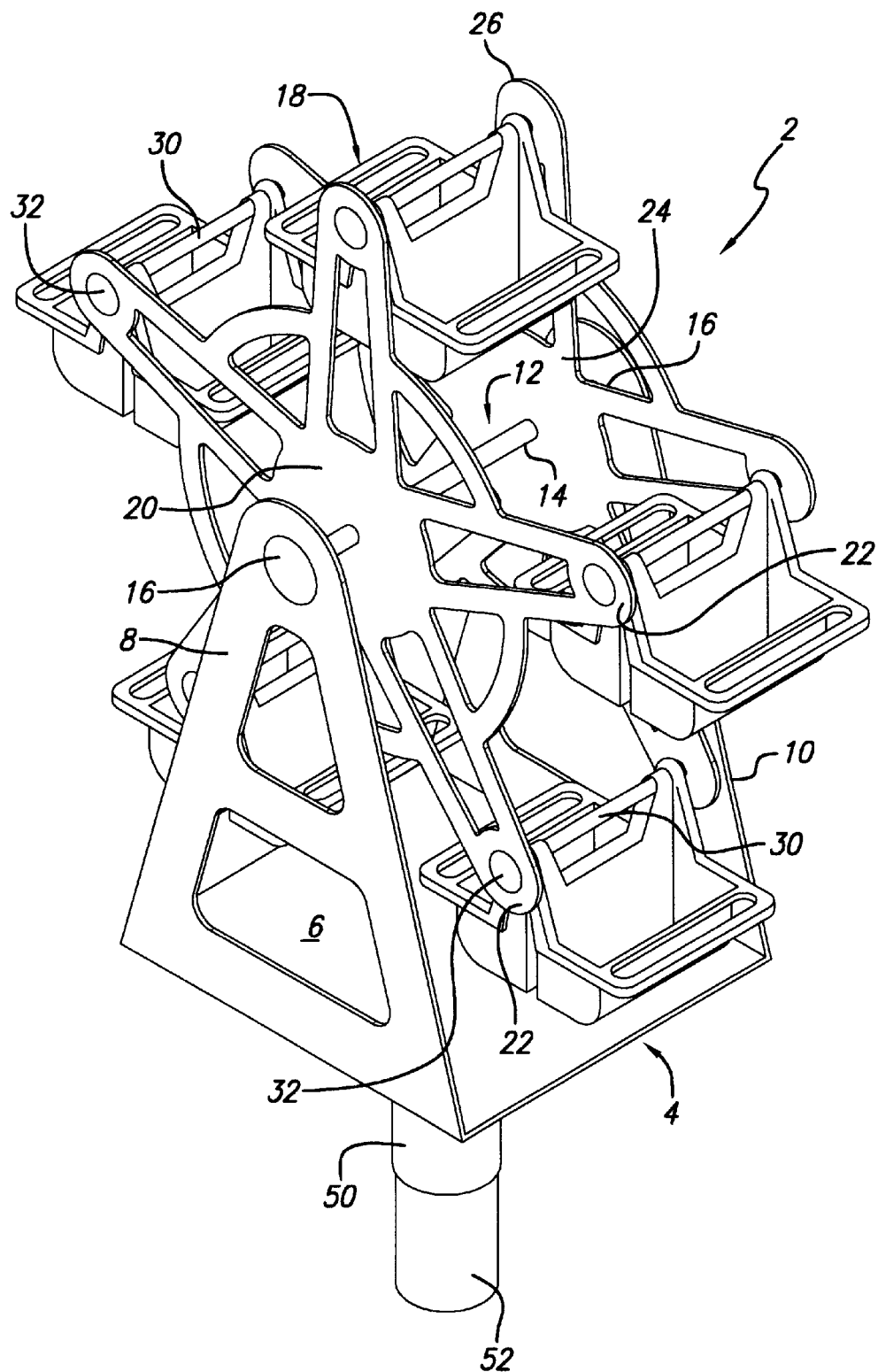
FIG. 5 is a perspective view of the ferris wheel-like structure of the invention and showing more details thereof.
Figure 6:
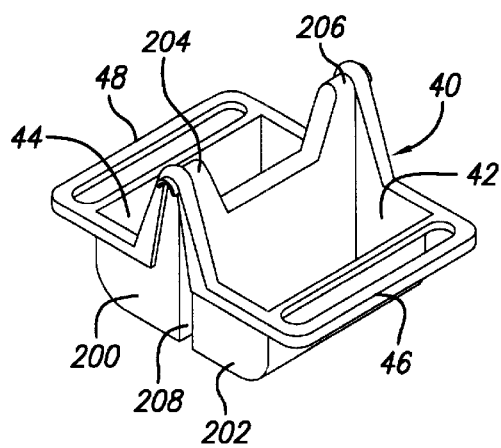
FIG. 6 is a perspective view of a container that may be releasably supported from the ferris wheel-like structure of the invention as shown in the previous figures of drawings.

The ferris wheel-like structure 2 as shown in FIG. 5 is shown as being made of metal of a relatively thin gauge and preferably of attractive esthetic colors or of rust proof materials so as to better endure the ambient environment in which the ferris wheel-like structure 2 finds itself.

In the particular instance shown in FIG. 5 the base 6 is secured to a coupling or the like 50 which is adapted to receive a pole or rod 52 for placement in the ground at a level above which predators such as cats, etc. would not be able to reach.

Figure 2:
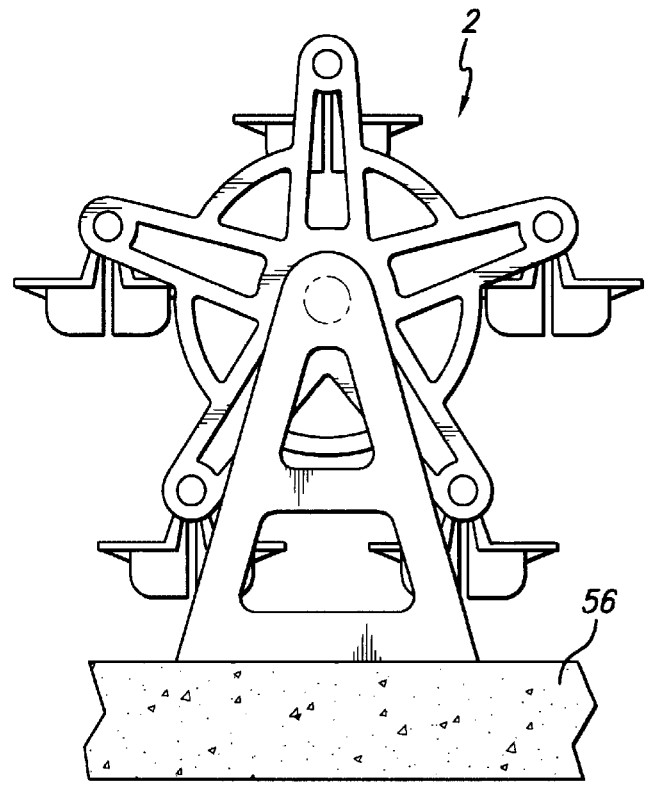
FIG. 2 is a view similar to FIG. 1 of the ferris wheel-like structure of the invention but shows the same being supported on a planar surface.
Figure 3:
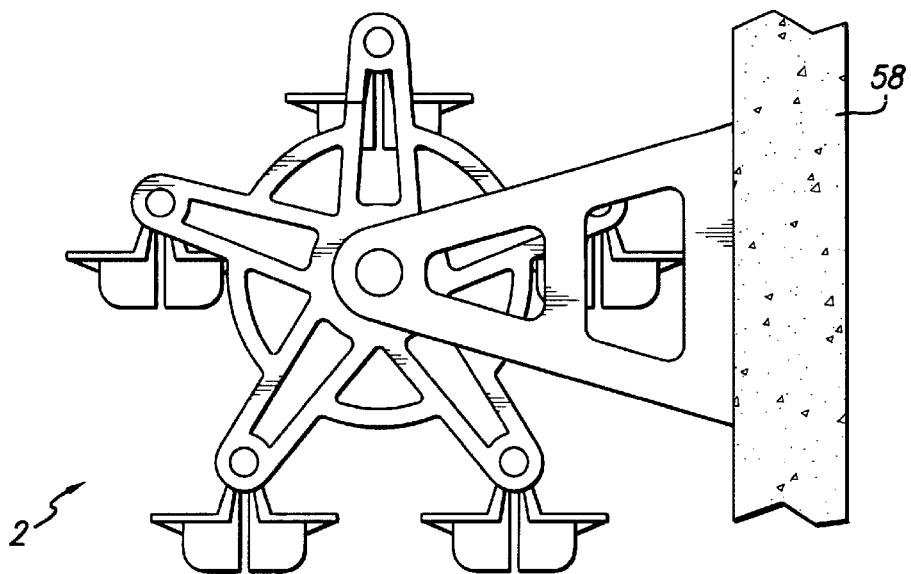
FIG. 3 is a view similar to FIG. 2 of the ferris wheel-like structure of the invention but illustrating how the same may be supported from a vertical support surface.
Figure 4:
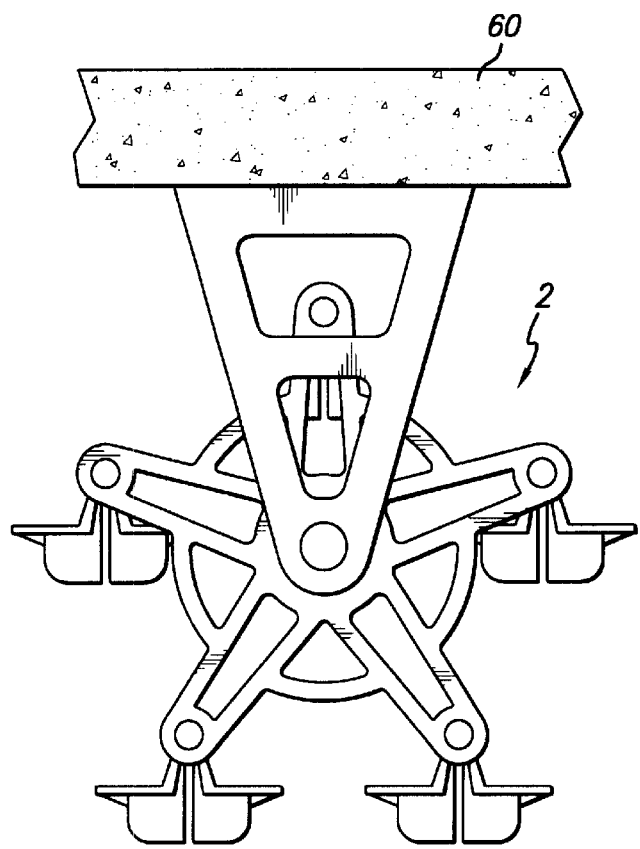

In other instances as shown in FIGS. 2, 3 and 4 the ferris wheel-like structure 2 of the invention may be placed or supported on a surface such as concrete 56 in a horizontal position as seen in FIG. 2 or it may be secured upon a vertical support structure 58 as shown in FIG. 3 or even from an overhead planar structure or non-planar structure 60 as shown in FIG. 4. The means of support are many as those of skill in the art will recognize.

In each instance of support, it is clearly seen that the extending support members forming a common axis of support will support the ferris wheel-like structure 2 in a manner such that the rotatable element supported therebetween is freely rotatable either by hand or by reason of a bird alighting on one of the perches of the birdseed holder. The means of supporting and securing the base 6 of the ferris wheel-like structure 2 to either of the support structures are those which one would normally encounter and are conventional and those of ordinary skill in the art will once appreciate how to fasten same whether it be by nails, bolts, screws or other fastening means and even adhesives.

Figure 7:
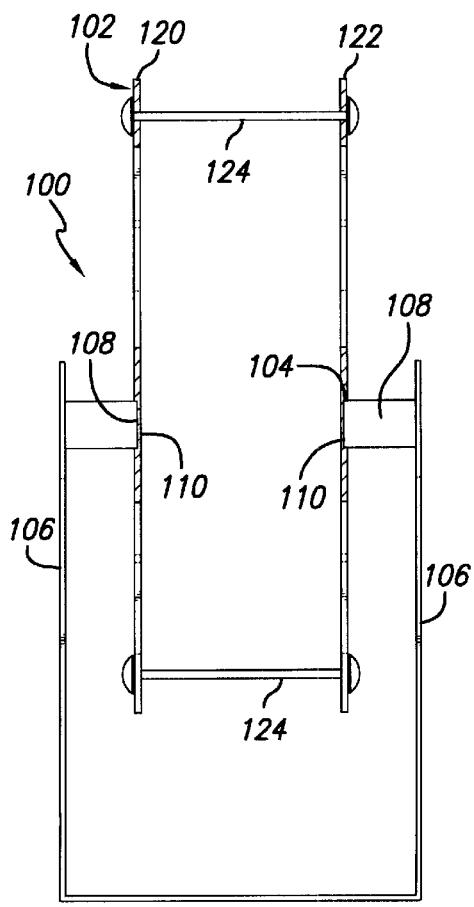
FIG. 7 is a schematic illustration of the ferris wheel-like structure of the invention that has a stub shaft and hub support for the rotating member.

Referring to FIG. 7 it will be seen that a bird feeder 100 is schematically illustrated and in this particular case the rotating element 102 is provided with a hub and stub shaft arrangement 104 wherein the extending support members 106 are provided with stub shafts 108 which fit into the hub portion 110 of the rotating element 102 formed by spaced apart members 120 and 122 having therebetween, in secure relationship, rods 124 by which birdseed cups or the like may be supported like those previously described.

Figure 8:
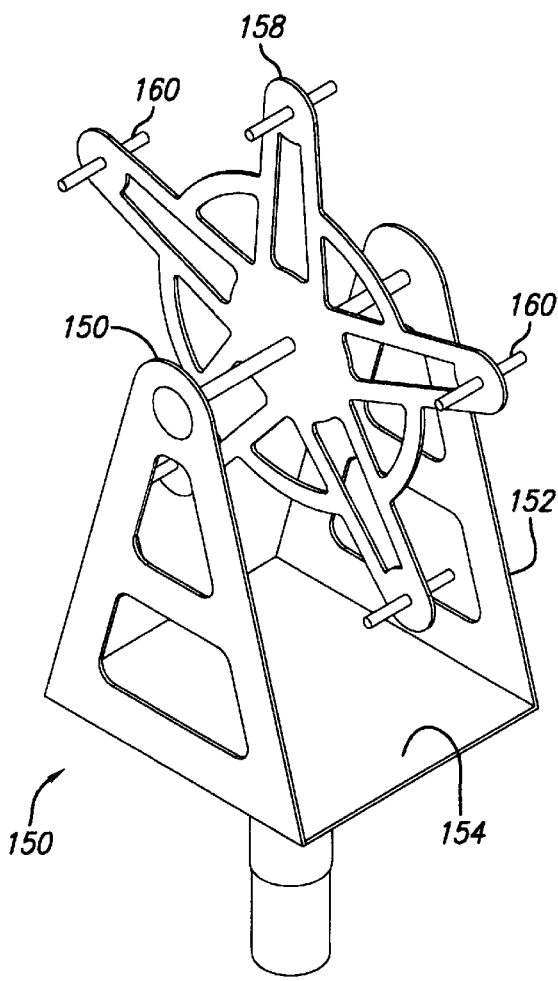
FIG. 8 is a schematic illustration of still another alternate embodiment of the invention wherein a singular rotating member is utilized between an extending and upright support structure.

Referring to FIG. 8, still another embodiment of the invention is schematically illustrated wherein the bird feeder 150 comprises extending upstanding members 152 and base 154 either being of unitary or multiple piece construction which supports, through an axel 156, rotating member 158 having a plurality of spaced support rods 160 by which containers, not shown, may be supported to thus provide a ferris wheel-like structure having a singularly configured rotating member which supports cups or the like on the rods 160 to achieve the same dynamic action when the ferris wheel-like structure 158 is utilized as a bird feeder.

The container 40 comprising seed or plant receptacles may, as previously indicated, hold plants or bird food comprising birdseed or even in some instances it may be desired that alternate holders on the ferris wheel-like structure 2 may hold plants and the adjacent holders would contain birdseed but such choices would be up to the user of the device. The containers 40 are ideally made of plastic wherein the structure is unitary in nature and comprises, as seen, two opposed container or receptacle members 200 and 202 having a common bridge 204 and 206 which provides a space 208 between the compartments 200 and 202. The material of construction may be such that the bridge segments 204 and 206 allow for some flexibility so that the same may be easily placed over the support, spacer rods or axels 30 (in snap fit relationship) upon which the containers 42 are mounted in freely pivotal relationship to add even more dynamic action to the ferris wheel-like structure 2 of the invention. Obviously the containers may not be of dual construction as illustrated and need not be of plastic and also may be rigidly secured to the support, spacer rods or axels 30 such that no rotational independent movement of the containers 40 take place except by reason of their connection to a rotatable member such for example 18 in which case they would revolve in circular fashion much like the conventional ferris wheel of carnival reputation. The width and configuration of the containers 40 or otherwise will of course be dictated by the remainder of the elements making up the devices 2, 100 and 150.

While the present invention has been described as being fabricated for the most part of metal, it will be obvious to those with ordinary skill in the art that plastic for the major components, and indeed all the components, may be acceptable and indeed preferable depending upon the environment in which the ferris wheel-like structure 2 of the invention is to be utilized. Additionally, while the base 6 and extending support members 8 and 10 have been shown as being made of one piece, multiple segments may also be used and will also present themselves of ordinary skill in the art.

Thus there has been described a unique, ferris wheel-like structure that has the attributes of being usable in one of a plurality of positions and wherein the structure provides for the feeding of birds or the like which results in dynamic rotation of the rotating element of the bird feeder and thus presents many hours of enjoyment to those who are into bird watching and the like.

What is claimed is:

1. A ferris wheel-like structure comprising the combination of:
   at least two spaced apart extending support members forming a common axis of support;
   a rotatable member operatively connected to said at least two extending support members, said rotatable member being freely and rotatably supported from said extending support members, said rotatable member being disposed in axially spaced manner from each of said extending support members, said rotatable member including a plurality of ray-like members radiating therefrom to terminate at respective distal end portions;

at least one holding member coupled to said distal end portion of one said ray-like member of said rotatable member; and a base operatively connected to said at least two spaced apart extending support members and being adapted to support said ferris wheel-like structure in one of a myriad of positions.

2. A ferris wheel-like structure in accordance with claim 1 wherein said rotatable member includes at least two spaced apart members having ray-like extensions.

3. A ferris wheel-like structure in accordance with claim 2 including at least one container which is pivotally supported between said at least two spaced apart members having ray-like extensions.

4. A ferris wheel-like structure in accordance with claim 3 wherein said rotatable member has at least two ray-like extensions symmetrically supported therefrom.

5. A ferris wheel-like structure in accordance with claim 4 wherein said at least one container is supported between each of said at least two ray-like extensions.

6. A ferris wheel-like structure in accordance with claim 5 wherein an axle provides the common axis of support.

7. A ferris wheel-like structure in accordance with claim 5 wherein each of said extending support members is provided with a stub shaft support by which said rotatable member is supported.

8. A ferris wheel-like structure in accordance with claim 7 wherein said rotatable member has a hub support to matingly engage said stub shaft support of said extending support members.

9. A ferris wheel-like structure in accordance with claim 6 wherein a spacer extends between each of the at least two spaced apart members.

10. A ferris wheel-like structure in accordance with claim 9 wherein a holder is releasably held on said spacer and forms a container for bird seed.

11. A ferris wheel-like structure comprising the combination of:

at least two spaced apart extending and upstanding support members forming a common axis of support;

a rotatable member including two spaced apart members having extending rays radiating in symmetrical fashion to terminate at respective distal end portions, said rotatable member being operatively supported from said at least two extending and upstanding support members in freely rotatable fashion, each said extending ray being disposed in axially spaced manner from said extending support members, said extending ray members having a rod member extending between said respective distal end portions thereof;

a plurality of holding members each coupled to one said rod member for holding a predetermined material, said holding members each comprising a unitarily constructed double container having opposed container portions and an interconnecting bridge portion which is frictionally and releasably secured upon said rod members extending between said ray members, and a planar base member operatively connected to and extending between said at least two spaced apart extending and upstanding support members wherein said planar base member may be secured in one of a plurality of positions and wherein said rotatable members may freely rotate about said axis and wherein said holding members are pivotable about said rod members.

* * * * *